Sept. 23, 1952 W. E. SHORE 2,611,400
SAW TABLE FOR PORTABLE POWER DRIVEN RECIPROCATING HANDSAWS
Filed June 25, 1949 2 SHEETS—SHEET 1
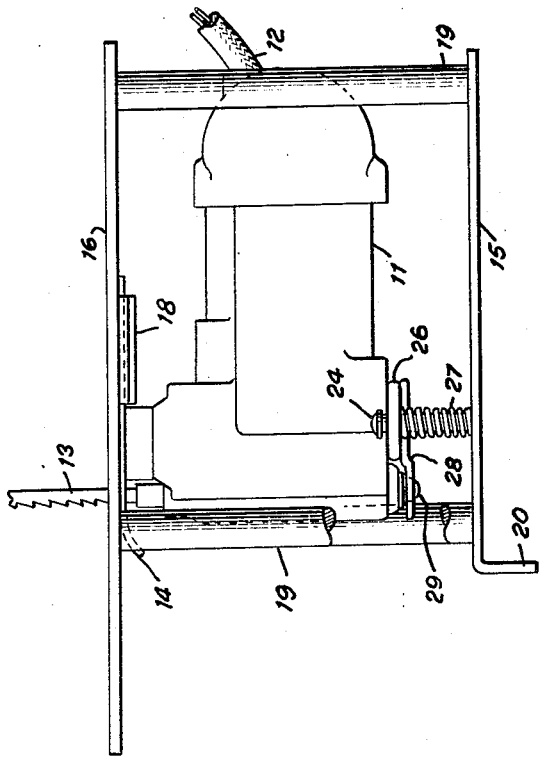
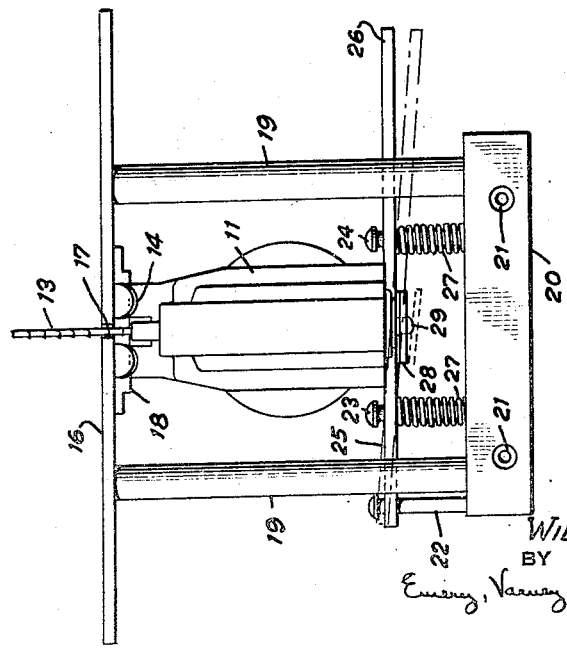
INVENTOR
*William E. Shore*
BY
*Emery, Varney, Whittemore & Dix*
ATTORNEYS Sept. 23, 1952 W. E. SHORE 2,611,400
SAW TABLE FOR PORTABLE POWER DRIVEN RECIPROCATING HANDSAWS
Filed June 25, 1949 2 SHEETS—SHEET 2
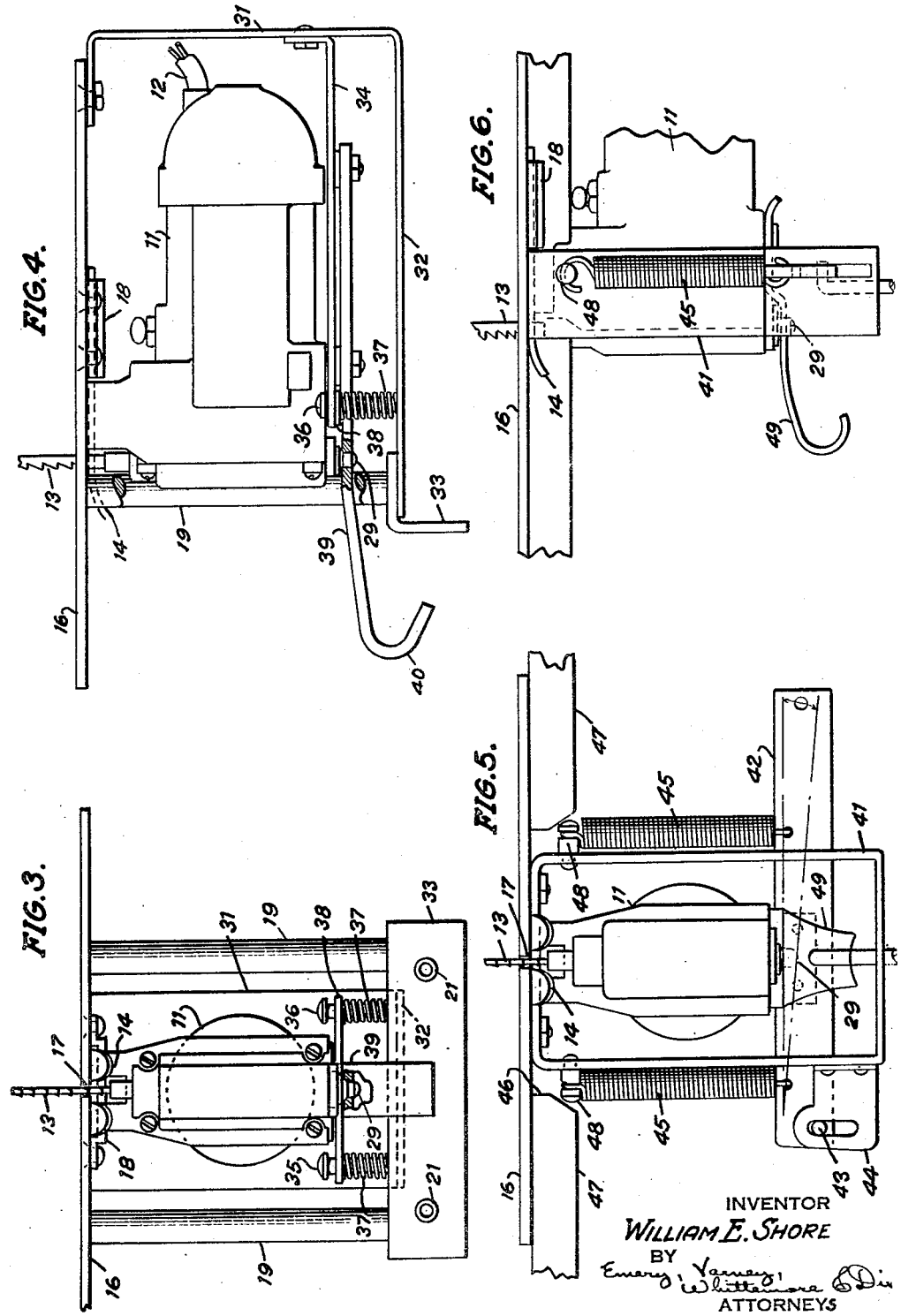
INVENTOR
WILLIAM E. SHORE
BY
ATTORNEYS Patented Sept. 23, 1952

2,611,400

UNITED STATES PATENT OFFICE 2,611,400

SAW TABLE FOR PORTABLE POWER DRIVEN RECIPROCATING HANDSAWS

William E. Shore, West New Brighton, N. Y., assignor to Harold S. Forsberg, Shelton, Conn.

Application June 25, 1949, Serial No. 101,359

12 Claims. (Cl. 143—132)

This invention relates to tables for portable saws, and more particularly to tables for holding an electric hand saw which has a reciprocating sabre type saw blade, the purpose of the table being to convert an electric saw of the type which normally is moved over the material to be sawed, into a saw for bench use, wherein the material to be sawed is moved over the saw.

It is an object of the invention to provide improved saw tables of the kind described. It is a further object of the invention to provide improved saw tables in which the electric hand saw may be instantly inserted or removed merely by depressing a simple latch or locking device which holds the saw firmly in the table. Other objects and advantages of the invention will appear hereinafter.

Preferred embodiments of the invention have been selected for purposes of illustration and description and are shown in the accompanying drawings, wherein:

Figure 1 is a front elevation of a saw table showing an electric hand saw held therein;

Figure 2 is a side elevation of the saw table and saw shown in Figure 1, looking toward the right-hand side of Figure 1;

Figure 3 is a front view of a modified table construction, showing a saw held therein;

Figure 4 is a side elevation of the structure shown in Figure 3, looking toward the right-hand side of Figure 3;

Figure 5 is a front view of still another modification of the saw table; and

Figure 6 is a side elevation of the table and saw shown in Figure 5, looking toward the right-hand side thereof.

A saw with which the tables of the present invention are adapted to be used is disclosed in the pending patent application, Serial No. 36,840, filed July 3, 1948, by Harold S. Forsberg, assignee of the present application.

Referring now to the drawings, wherein like reference characters denote corresponding parts in the several views, Figures 1 and 2 disclose a preferred embodiment of the invention.

The electric motor of the saw is enclosed within the housing 11 and is supplied with electricity through a cord 12 entering one end of the housing. The other, and somewhat enlarged, end of the housing contains means for converting the rotary motion of the motor shaft into reciprocating motion, along a line normal to the motor axis, for imparting reciprocatory motion to the sabre type saw blade 13. Secured to the enlarged end of the housing 11 is a saw plate shoe 14 having a curved forward end and a slot through which the saw blade extends. The saw plate shoe normally presses against the slides over the surface of the material being sawed when the saw is in use without a table such as is disclosed herein.

As shown in Figures 1 and 2, the means for converting such a saw into a table saw comprises a base plate 15 and a saw table plate 16, the latter being supported parallel to and spaced above the base plate, as by means of the posts 19 connected at their ends to the base plate and to the saw table plate, respectively. When the saw table is in use, the base plate 15 may rest on a work bench, or table, or other firm support, or the downwardly turned forward edge 20 thereof may be gripped in a vise. This forward edge 20 may be provided with holes, such as are shown at 21, for securing the base plate to a bench, table or the like by screws or bolts.

The saw table plate 16 has a narrow saw slot 17 extending inwardly from the front edge thereof to a point somewhere near the center of the plate. Desirably the saw slot is little more than wide enough to permit sliding a saw blade easily therethrough, except at its inner end, where it is widened to accommodate for vibration of the saw blade while in use.

On the under side of the saw table plate 16, near the inner end of the saw slot 17, is a guide 18 for locating and holding the saw plate shoe 14 in position against the under side of the saw table plate with the saw blade extending upwardly through the saw slot in sawing position. This guide and holding means may be cast integral with the saw table plate, or secured thereto by screws, or by welding, or by other known methods. The guide 18 is disclosed in the drawings as a clip, and more particularly a strap clip, which forms a slot or channel adapted to receive slidably the heel of the saw plate shoe 14 and hold the flat surface of the saw plate shoe against the under side of the saw table plate with the saw housing suspended, as shown.

A saw may be inserted in the table by inverting the saw from its normal operating position, that is, by turning the saw so that the blade points unwardly, and then sliding the saw plate shoe 14 back under the saw table plate with the saw plate shoe moving in contact with the under side of the saw table plate and with the saw blade moving in the slot 17. As the saw blade approaches the inner end of the saw slot, the heel of the saw plate shoe enters the guide and holder 18, and when the saw has been pushed back as far as it will go the member 18 holds the saw against the under side of the saw table plate with the saw blade extending upwardly through the widened inner end of the slot in sawing position.

In providing means for maintaining the saw in this position it is desirable to avoid the use of bolts, nuts and screws for a number of reasons. In most instances, the saw housing 11 will be a relatively thin casting of light metal, and the pressure which might be exerted on the housing by inexperienced users in adjusting screws or the like could easily break the housing. The danger would be particularly great in the case of home or hobby workers, who may be expected to be among the principal users of a table of this type, because most such workers could not be expected to realize the magnitude of the pressures exerted on the saw housing. Moreover, the use of any screw type holding means would require time for adjustment in inserting or removing a saw from the table, and there also would be danger that the screw means would loosen under vibration during operation of the saw.

According to this invention, means are provided for firmly holding the saw locked in sawing position on the under side of the saw table plate with a balanced resilient pressure which will always be the same. Moreover, this holding means may be actuated to engage and lock a saw in the table, or to disengage the saw so that it can be removed from the table, practically instantaneously and merely by depressing or releasing a latch or locking bar. Not only does the locking bar press the saw with a resilient pressure upwardly against the under side of the saw table plate, but it also locks and holds the saw firmly against transverse movement under the saw table plate.

Referring to Figure 1, projecting upwardly from the base plate 15 are the aligned studs 22, 23 and 24. The stud 22 is located near one side edge of the base plate and the studs 23 and 24 are equally spaced on opposite sides of the vertical plane through the longitudinal axis of the saw housing 11. The three studs pass through holes in a locking bar 25, which is held against removal from the studs by their headed upper ends. Surrounding each of the studs 23 and 24, between the base plate 15 and the locking bar 25, is a compression coil spring 27. Desirably the pressure exerted by these springs is somewhat greater than the weight of the saw and the locking bar, so that the springs press the locking bar upwardly against the saw housing and hold the saw plate shoe 14 against the under side of the saw table plate with a firm resilient pressure. This pressure should be great enough to hold the saw steady against vibrating forces which may be set up therein while in use, but should not be great enough to damage the saw housing.

The holes in the locking bar 25 through which the studs project desirably are short slots extending lengthwise of the bar, so that the bar has a limited freedom of movement in the direction of its longitudinal axis, as well as being able to slide up and down on the studs. The width of these slots should be only enough greater than the diameter of the studs to permit movement of the bar in the directions specified, and not great enough to permit movement of the bar in a horizontal direction normal to its longitudinal axis.

The stud 22 passes through the locking bar 25 near one of its ends and the other end of the bar extends out beyond the side of the base plate, as shown at 26, to provide a convenient handle or lever for actuating the locking bar.

Midway between the studs 23 and 24, the locking bar 25 is provided with means for interlocking with the saw housing to hold the latter against forward movement after the heel of the saw plate shoe 14 has been pushed all of the way back into the holder 18. For example, there may be a hole in the locking bar, or in a lug 28 secured thereto, which engages the screw head 29, or other projecting portion of the saw housing 11, to hold the saw against movement relative to the locking bar.

When inserting or removing a saw from the table, the handle end 26 of the locking bar is pressed down from a position substantially as shown by the solid lines in Figure 1 to the position shown by the broken lines. This depression of the locking bar compresses the springs 27 slightly and disengages the hole in the locking bar from the screw head 29, thus permitting the saw to be slid in or out of the table without interference by the locking bar.

When a saw is mounted in the table, as shown in Figures 1 and 2, it is pressed up against the saw table plate by the locking bar and the springs with a pressure sufficient to overcome any vibrating forces set up in the saw. By employing similar springs equally spaced on opposite sides of the saw, and a floating locking bar for engaging the saw housing, the pressure always is uniform and without tendency to turn or twist the saw. This pressure holds the saw steady and relieves much of the stress on the connection between the saw plate shoe and the saw housing. At the same time, the engagement of the screw head 29 by the lug 28 holds the saw firmly in the table against any tendency to slide forward.

The modification shown in Figures 3 and 4 differs from the embodiment just described, principally in the construction of the base plate and in the construction and arrangement of the locking bar. The saw housing 11 is suspended below the saw table plate 16 by the engagement of the heel of the saw plate shoe 14 with the holder 18, the latter being secured to the under side of the saw table plate, as in the first embodiment. Secured to the under side of the saw table plate near its rear edge is one end of a wide metal strap 31, which extends downwardly and then forwardly at a right angle, as shown at 32, to function as the base plate. Secured to the forward end of this base plate 32 is a piece of angle iron 33, which functions similarly to the downwardly turned forward edge 20 of the base plate 15 shown in Figures 1 and 2. The angle iron 33 and the forward end of the base plate may be held firmly in spaced relation below the saw table 16 by posts 19.

Projecting upwardly from the base plate 32 are the studs 35 and 36, equally spaced on opposite sides of the vertical plane through the longitudinal axis of the saw housing 11, and surrounded by similar compression coil springs 37. The upper ends of the studs pass through holes near the ends of the floating equalizer bar 38, which is pressed upwardly by the springs toward the saw housing 11. The equalizer bar is held on the studs by the heads on the upper ends thereof.

Attached to the vertical portion of the wide strap 31 at the rear of the saw holder is one end of a relatively narrow metal strap 34, which extends forwardly under the saw housing 11, in engagement therewith, and projects over and slightly beyond the equalizer bar 38. This strap 34 should be somewhat flexible. Thus the pressure of the springs 37 against the equalizer bar 38 presses the flexible strap 34 upwardly to hold the saw firmly against the saw table plate 16.

Secured to and forming a forwardly projecting extension of the flexible strap 34 is a locking bar 39. This locking bar is provided with means for interlocking with the saw housing to hold the latter against forward movement after the saw plate shoe 14 has been pushed all of the way back into the holder 18. For example, a hole in the locking bar engages the screw head 29, or other projecting portion of the saw housing, to hold the latter against movement relative to the locking bar.

The portion of the locking bar 39 projecting in front of the hole which receives the screw head 29 desirably is inclined downwardly so that as the saw is pushed back into the table the screw head 29 gradually pushes the locking bar downwardly until the screw head reaches the hole, at which time the locking bar is forced upwardly by the springs 37 to lock the saw in place in the table.

To release the saw for removal from the holder, the forward end of the locking bar 39 is depressed until the bar clears the screw head 29, and the saw may then be moved forward and out from the saw table plate. The forward end of the locking bar may be curled back on itself as shown at 40, or provided with other handle for convenience in depressing the bar, or suitable connection may be made to a foot pedal or other actuating device, if desired.

An advantage of the embodiment disclosed in Figures 3 and 4 lies in the fact that the longitudinal axes of the locking bar and its flexible mounting are approximately in alignment with each other and parallel to the longitudinal axes of the saw housing and the guide 18. These axes all fall in a common vertical plane, and when the screw head 29 enters the hole in the locking bar 39, the saw is held firmly against sliding movement in the guide 18. Moreover, this mounting permits a long bearing surface by the strap 34 against the saw housing to hold the sam firmly against the saw table plate.

Figures 5 and 6 show a modified holder for the saw in which there is no base plate such has been described for Figures 1 to 4, it being intended that the holder will be set down or slid back into a hole or slot 46 in the top 47 of a work bench or table, with the edge of the saw table plate resting on the bench or table top and supporting the holder which is suspended therefrom.

As in other embodiments, the saw housing 11 is suspended below the saw table plate 16 by the guide and holder 18, which engages the heel of the saw plate shoe 14, with the saw blade 13 extending upwardly through the slot 17 in the saw table plate 16 in sawing position. Secured by its upper ends to the under side of the saw table plate 16 is a U-shaped strap 41 forming a cradle extending down under the saw housing 11. Extending transversely under the saw housing 11, and through vertical slots in the opposite sides of the cradle strap 41, is a locking bar 42. The locking bar has secured in one end thereof a pivot pin 43, which has a limited freedom of movement in a vertical direction in a slot in the lug 44 secured to one side of the cradle.

Means are provided for forcing the locking bar 42 upwardly with a resilient pressure to engage and press the saw firmly against the saw table plate 16. As shown, two tension coil springs 45, arranged in vertical position on opposite sides of the cradle, are connected at their lower ends to the locking bar and at their upper ends to studs projecting outwardly from the sides of the cradle.

Secured to the locking bar 42, between the sides of the cradle 41, is an ear 49 provided with a hole to receive the screw head 29 of the saw and anchor the saw firmly against transverse movement relative to the saw table plate 16. If desired, the ear 49 may be extended forwardly on an incline, as shown, so that as the saw is pushed back into the holder the screw head 29 will automatically push the locking bar down until the screw head 29 reaches the hole in the ear 49 and permits the ear and locking bar to snap upwardly and lock the saw in sawing position in the table.

The saw may be released for removal from the table by depressing the locking bar 42. This may be done by reaching under the table and pressing down on the end of the locking bar opposite the pivot 43, or by a cord or other connection 50 to the bar at a point centered under the saw housing, or to the end of the bar.

It will be evident from the foregoing description that applicant has provided a holder capable of quickly and easily transforming a portable electric hand saw into a table saw which will serve the purpose of a more expensive hand saw or jig saw, but without limitation on the size of the material to be worked. The saw can be inserted in the holder merely by sliding it back under the saw table plate, or by depressing a latch and then sliding the saw into the holder. The saw is held firmly and securely in the holder and may be removed merely by depressing the latch and pulling the saw forward. The holder will have particular utility for hobby or home workers who wish to enjoy the advantages of both a portable motor driven hand saw and a bench saw at a minimum expense.

The invention herein disclosed may be variously modified and embodied within the scope of the subjoined claims.

What is claimed is:

1. A table for holding a portable electric saw which has a housing, a reciprocating sabre type saw blade and a saw plate shoe which normally presses against and moves over the surface of the material being sawed when the saw is in operation, comprising, in combination, a saw table plate having a saw slot extending inwardly from one edge thereof, a clip secured to the under side of the saw table plate adjacent the inner end of the saw slot and forming with the saw table plate a channel to receive slidably and hold the heel of the saw plate shoe against the under side of the saw table plate with the saw housing suspended below the saw table plate and with the saw blade extending upwardly through the saw slot in sawing position, a locking bar for engaging the under side of the saw housing when the saw is suspended below the saw table plate with the heel of the saw plate shoe held by the clip, mounting means for said locking bar supporting the locking bar spaced below the saw table plate and permitting limited movement of the locking bar toward and away from the saw table plate, and spring means operatively associated with the locking bar and its mounting means resiliently pressing the locking bar upwardly toward the saw table plate.

2. A table for holding a portable electric saw which has a housing, reciprocating sabre type saw blade and a saw plate shoe which normally presses against and moves over the surface of the material being sawed when the saw is in operation, comprising, in combination, a saw table plate having a saw slot therethrough, a clip secured to the under side of the saw table plate adjacent one end of the saw slot to receive and hold the saw plate shoe against the under side of the saw table plate with the saw housing suspended below the saw table plate and with the saw blade extending upwardly through the saw slot in sawing position, a bar spaced below the saw table plate and having a limited range of movement toward and away from the saw table plate, and means pressing said bar upwardly toward the saw table plate.

3. A saw table according to claim 2, characterized by the fact that the means for pressing the saw housing upwardly includes spring means exerting a resilient pressure which is in excess of the weight of the saw.

4. A saw table according to claim 2, characterized by the fact that the means for pressing the saw housing upwardly includes a floating bar extending across under the housing and spring means acting on said bar on opposite sides of the vertical axial plane through the casing to press the bar upwardly against the housing.

5. A table for holding a portable electric saw which has a housing, a reciprocating sabre type saw blade and a saw plate shoe which normally presses against and moves over the surface of the material being sawed when the saw is in operation, comprising, in combination, a saw table plate having a saw slot therethrough, a clip secured to the under side of the saw table plate adjacent one end of the saw slot to receive and hold the saw plate shoe against the under side of the saw table plate with the saw housing suspended below the saw table plate and with the saw blade extending upwardly through the saw slot in sawing position, a bar extending across the saw slot and spaced below the saw table plate to engage the saw to hold the saw plate shoe firmly against the saw table plate when the saw is in use, guide means for the bar permitting a limited movement thereof toward and away from the saw table while substantially preventing lateral movement thereof, and means for resiliently pressing the bar upwardly against the saw.

6. A saw table according to claim 5, characterized by the inclusion of handle means for quickly depressing the bar to permit inserting the saw in the table, or removing the saw therefrom.

7. A saw table according to claim 5, characterized by the fact that the bar has an interlocking engagement with the housing of the saw to prevent lateral movement of the saw under the saw table plate.

8. A table for holding a portable electric saw which has a housing, a reciprocating sabre type saw blade and a saw plate shoe which normally presses against and moves over the surface of the material being sawed when the saw is in operation, comprising, in combination, a saw table plate having a saw slot extending inwardly from one edge thereof, clip means secured to the under side of the saw table plate adjacent the inner end of the saw slot providing a channel to receive slidably and hold the saw plate shoe against the under side of the saw table plate with the saw housing suspended below the saw table plate and with the saw blade extending upwardly through the saw slot in sawing position, means spaced below the saw table plate for engaging the housing of the saw when the saw plate shoe has been received by the clip means to hold the saw firmly against lateral movement relative to the saw table plate, and means for releasing such holding means.

9. A table for holding a portable electric saw which has a housing, a reciprocating sabre type saw blade and a saw plate shoe which normally presses against and moves over the surface of the material being sawed when the saw is in operation, comprising, in combination, a saw table plate having a saw slot extending inwardly from one edge thereof, clip means secured to the under side of the saw table plate adjacent the inner end of the saw slot to receive and hold the saw plate shoe against the under side of the saw table plate with the saw housing suspended below the saw table plate and with the saw blade extending upwardly through the saw slot in sawing position, means spaced below the saw table plate for engaging the saw housing to hold the saw firmly against lateral movement relative to the saw table plate, and spring means to press the saw upwardly against the saw table plate with a resilient pressure which is in excess of the weight of the saw.

10. A table for holding a portable electric saw which has a housing, a reciprocating sabre type saw blade and a saw plate shoe which normally presses against and moves over the surface of the material being sawed when the saw is in operation, comprising, in combination, a base plate, a saw table plate having a saw slot extending inwardly from one edge thereof, means supporting the saw table plate substantially parallel to and spaced above the base plate, clip means secured to the under side of the saw table plate adjacent the inner end of the saw slot to receive and hold the saw plate shoe against the under side of the saw table plate with the saw housing suspended between the saw table plate and the base plate and with the saw blade extending upwardly through the saw slot in sawing position, a locking bar mounted between the saw table plate and the base plate and having a limited range of movement toward and away from the saw table plate, and spring means pressing the locking bar upwardly to engage the saw housing to hold the saw plate shoe firmly against the saw table plate when the saw is in use.

11. A table for holding a portable electric saw which has a housing, a reciprocating sabre type saw blade and a saw plate shoe which normally presses against and moves over the surface of the material being sawed when the saw is in operation, comprising, in combination, a base plate, a saw table plate having a saw slot extending inwardly from one edge thereof, means supporting the saw table plate substantially parallel to and spaced above the base plate, guide means secured on the under side of the saw table plate adjacent the inner end of the saw slot to locate the saw plate shoe of the saw against the under side of the saw table plate with the saw blade extending upwardly through the saw slot in sawing position, a locking bar mounted between the base plate and the saw table plate for engaging the housing of the saw for holding the saw plate shoe of such saw firmly against the saw table plate with the saw blade in sawing position.

12. Means for converting an electrically driven hand saw having a housing, a reciprocating sabre type saw blade and a saw plate shoe adapted normally to be moved over the material to be sawed, into a table saw wherein the material to be sawed is moved over a saw table, comprising, in combination, a base plate, a saw table plate, having an opening therethrough, means supporting the saw table plate substantially parallel to and spaced above the base plate, guide means secured on the under side of the saw table plate to locate the saw plate shoe of the saw against the under side of the saw table plate with the saw blade extending upwardly through the hole therein, a locking bar mounted between the base plate and the saw table plate for engaging the housing of the saw, and spring means engaging the locking bar for pressing the saw upwardly against the saw table plate while substantially preventing movement of the saw transversely under the saw table plate.

WILLIAM E. SHORE.

REFERENCES CITED

The following references are of record in the file of this patent:

UNITED STATES PATENTS

| Number | Name | Date |
|---|---|---|
| 1,506,154 | Berthelsen | Aug. 26, 1924 |
| 1,663,486 | Wertz | Mar. 20, 1928 |
| 1,813,783 | Tomlinson et al. | July 7, 1931 |
| 1,816,069 | Bennett | July 28, 1931 |
| 1,832,283 | Earhart | Nov. 17, 1931 |
| 1,865,759 | Hughes | July 5, 1932 |
| 2,458,846 | Gilmore | Jan. 11, 1949 |
| 2,501,631 | Oschwald | Mar. 21, 1950 |

FOREIGN PATENTS

| Number | Country | Date |
|---|---|---|
| 241,050 | Switzerland | June 1, 1946 |